United States Patent Office 3,539,612
Patented Nov. 10, 1970

3,539,612
BASIC ESTERS OF N-PHENALKYLDITHIO-
CARBAMIC ACIDS
Robert C. Tweit, Wilmette, Ill., assignor to G. D. Searle
& Co., Chicago, Ill., a corporation of Delaware
No Drawing. Filed Dec. 12, 1966, Ser. No. 600,792
Int. Cl. A01n 9/12; C07c 155/08; C07d 51/70
U.S. Cl. 260—455                    16 Claims

ABSTRACT OF THE DISCLOSURE

Basic esters of N-phenylalkyl dithiocarbamic acids—for example, 2-aminoethyl benzyldithiocarbamate hydrochloride—and their pharmacological properties—including anti-bacterial, anti-protozoal, anti-fungal, anti-algal, and anti-inflammatory activity—are disclosed.

---

This invention relates to basic esters of N-phenalkyl-dithiocarbamic acids and processes for the preparation thereof. More particularly, this invention relates to new, useful, and unobvious chemical compounds of the formula

wherein $\phi$ represents a phenyl radical optionally substituted by one or more halogens and/or alkyl, alkoxy, alkanoyl, trifluoromethyl, nitro, and/or phenyl radicals; and Z represents an optionally alkylated amino radical.

Among the optional phenyl substituents, the alkyl, alkoxy, and alkanoyl groupings are preferably of lower order. Typical lower alkyl groupings are methyl, ethyl, propyl, isopropyl, butyl, isobutyl, sec-butyl, tert-butyl, pentyl, neopentyl, hexyl, isohexyl, heptyl, and like monovalent, saturated, acyclic, straight- or branched-chain, hydrocarbon moieties of empirical formula $$-C_nH_{2+n1}$$

wherein $n$ represents a positive integer less than 8. By the same token, lower alkoxy groupings have the formula lower alkyl—O— and lower alkanoyl groups of the formula

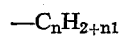

Among the latter groupings, the acetyl radical is particularly preferred. Any of the halogens are advantageous, but fluorine, chlorine, and bromine are especially so. Phenyl substituents can be alike or different, and their positioning about the benzene ring is not critical. Whereas as many as 5 substituents can be present, from 1 to 3 is preferred except that substitution by 1 phenyl grouping only is ordinarily most desirable.

Z in the generic formula for compounds of this invention subsumes both the primary amino radical, —NH₂, and secondary and tertiary amino groupings resulting from replacement of 1 or both hydrogens in the primary amino radical by a corresponding number of alkyl groupings. The secondary amino radicals comprehended

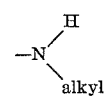

are preferably those in which the alkyl constituent called for contains from 1 to as many as 10 carbon atoms. The alkyl groupings present when Z designates a tertiary amino radical can either be discrete—in which case they are preferably of lower order and give rise to groupings of the formula

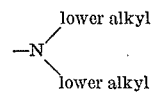

—or they can be joined together directly or through oxygen or a second nitrogen atom to compose cyclic amino groupings optionally but not necessarily exclusively comprising at least 4 and as many as 7 carbon atoms as illustrated in the examples hereafter. Typical of the cyclic amino radicals contemplated by Z are pyrrolidino, methylpyrrolidino, dimethylpyrrolidino, trimethylpyrrolidino, piperidino, methylpiperidino, dimethylpiperidino, methylethylpiperidino, morpholino, piperazino, methylpiperazino, ethylpiperazino, and like monovalent, 5- and 6-membered heterocyclic groupings among which piperazino, N-methylpiperazino, morpholino, and pyrrolidino and piperidino radicals optionally substituted by a methyl or ethyl grouping are preferred. The terminal "ino" in the heterocyclic radical names set forth denotes attachment thereof via nitrogen.

The alkylene radicals called for in the generic formula above, like the alkyl, alkoxy, and alkanoyl radicals comprehened, are preferably of lower order, for example, methylene, ethylene, trimethylene, propylene, tetramethylene, 1,1-dimethylethylene, pentamethylene, 2,2-dimethyltrimethylene, and homologous and/or isomeric saturated, acyclic, straight- or branched-chain, hydrocarbon groupings of the formula $$-C_nH_{2n}-$$

wherein $n$ is defined as before. Especially preferred are those lower alkylene radicals which separate the phenyl group from the dithiocarbamoyl group by 1, 2, or 3 carbon atoms.

The compounds to which this invention relates are useful by reason of their valuable pharmacological properties—most importantly, their surprising antibacterial effect against *Diplococcus pneumoniae*. Further, the subject compounds inhibit dicotoyledonous seed germination and are likewise antibiotic in respect of the bacteria, *Bacillus subtilis* and *Escherichia coli*; protozoa such as

*Tetrahymena gelleii* and *Tritrichomonas foetus*; fungi such as *Trichophyton mentagrophytes, Candida albicans,* and *Ceratocystis ulmi*; and algae such as *Chlorella vulgaris*. Moreover, the compounds of this invention counteract both edema and granuloma associated with the inflammatory response to tissue insult.

Those skilled in the art will recognize that the baisc esters of this invention are adapted to formation of nontoxic acid addition and quaternary ammonium salts of the formula

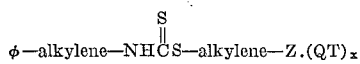

wherein $\phi$ and Z have the meanings previously assigned; Q is selected from among hydrogen and lower alkyl, hydroxy-(lower alkyl), and lower alkenyl radicals, as also such aralkyl radicals as benzyl, phenethyl, and naphthylmethyl; T represents 1 equivalent of an anion—for example, chloride, bromide, iodide, nitrate, pamoate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which in combination with the cationic portion of a salt aforesaid, is neither pharmacologically nor otherwise undesirable in pharmaceutical dosage; and $x$ is 1 or 2, depending upon and identical with the number of basic nitrogen atoms present in the molecule. Such salts are fully equivalent to the corresponding basic esters for the purposes herein set forth.

Preparation of the subject compounds proceeds by contacting an appropriate phenalkyl isothiocyanate

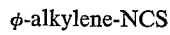

with an appropriate aminoalkanethiol

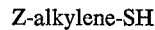

or hydrochloride thereof in a solvent medium—commonly methanol—to give the corresponding basic ester or hydrochloric acid addition salt, respectively. (The aminoalkanethiol hydrochloride is used when the amino constituent is primary or secondary, in which circumstance a trace of triethylamine is incorporated as a catalyst.) Alternatively, the hydrochloric acid addition salts can be prepared by contacting the triethylamine salt of an appropriate phenalkyldithiocarbamic acid

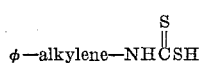

with an appropriate aminoalkyl chloride hydrochloride

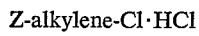

in methanolic or comparable solvent medium. In the foregoing formulas for intermediates whereby the compounds of this invention can be prepared, $\phi$ and Z retain the meanings previously assigned.

Conversion of a basic ester of this invention to an acid addition salt is accomplished by admixture of the basic ester with 1 or 2 equivalents of any of various inorganic and strong organic acids, the anionic portion of which conforms to T as hereinbefore defined. Similarly, contacting a basic ester with 1 or 2 equivalents of an organic ester

QT (Q and T being defined as before) affords the corresponding quaternary ammonium salt. Quaternization takes place at temperatures ranging between 25 and 100° C. in an inert solvent such as chloroform, acetone, butanone, methanol, butanol, or the like. The reaction is ordinarily completed in from 1 to 48 hours and is generally carried out in a closed system if a lower alkyl halide—such as methyl chloride—is one of the reagents. Using methyl bromide, the preparation of quaternary salts can be smoothly effected in butanone solution at 70° C. after a reaction period of approximately 1 hour.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade, pressures in millimeters of mercury, and relative amounts of materials in parts by weight, except as otherwise noted.

EXAMPLE 1

2-aminoethyl benzyldithiocarbamate hydrochloride

To a mixture of 116 parts of 2-aminoethanethiol hydrochloride with 148 parts of benzyl isothiocyanate and 800 parts of methanol is added 3 parts of triethylamine. Heat is given off. After approximately 5 minutes, 420 parts of ether is introduced. Precipitation occurs. The precipitate, isolated by filtration and dried in air, melts at 172–173.5°. The product thus isolated is 2-aminoethyl benzyldithiocarbamate hydrochloride, having the formula

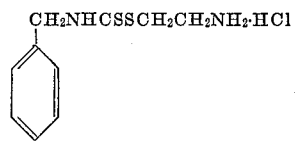

EXAMPLE 2

6-aminohexyl benzyldithiocarbamate hydrochloride

A mixture of 85 parts of 6-aminohexanethiol hydrochloride with 75 parts of benzyl isothiocyanate, 120 parts of methanol, and 2 parts of triethylamine is gently warmed until solution occurs. The solution is then chilled and allowed to stand while precipitation takes place. The precipitate is filtered off and dried in air. The product thus isolated is 6-aminohexyl benzyldithiocarbamate hydrochloride, having the formula

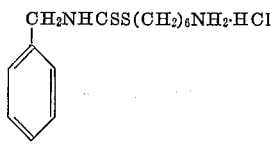

EXAMPLE 3

2-decylaminoethyl benzyldithiocarbamate hydrochloride

To 36 parts of isopropanolic 25% hydrogen chloride and 64 parts of methanol is added 54 parts of 2-decylaminoethanethiol. Solution, followed by precipitation, occurs. Upon addition of 37 parts of benzyl isothiocyanate, solution followed by precipitation reoccurs. The latter precipitate, filtered off and dried in air, melts at 145–147°.

The product thus isolated is 2-decylaminoethyl benzyldithiocarbamate hydrochloride, having the formula

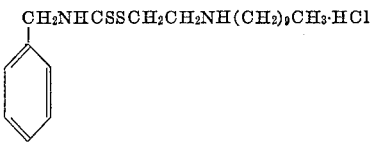

CH₂NHCSSCH₂CH₂NH(CH₂)₉CH₃·HCl

EXAMPLE 4

(A) 2-dimethylaminoethyl benzyldithiocarbamate hydrochloride

To a mixture of 146 parts of 2-dimethylaminoethanethiol hydrochloride with 148 parts of benzyl isothiocyanate and 800 parts of methanol is added 3 parts of triethylamine. The resultant solution is filtered, and the filtrate is allowed to stand while precipitation occurs. The precipitate is separated by filtration and twice recrystallized from a mixture of chloroform and methanol to give 2-dimethylaminoethyl benzyldithiocarbamate hydrochloride melting at 170–171.5°.

(B) 2-dimethylaminoethyl benzyldithiocarbamate

To a mixture of 184 parts of 2-dimethylaminoethyl benzyldithiocarbamate hydrochloride with a solution of 30 parts of sodium hydroxide and 75 parts of sodium carbonate in 1000 parts of water is added, with stirring, 450 parts of ethyl acetate followed by dichloromethane q.s. solution of all solids. The aqueous phase is separated and discarded, whereupon the organic phase is washed with water, dried over anhydrous sodium sulfate, and stripped of solvent by vacuum distillation. The residue is crystallized from a mixture of dichloromethane and ether to give 2-dimethylaminoethyl benzyldithiocarbamate melting at 87.5–90°. The product has the formula

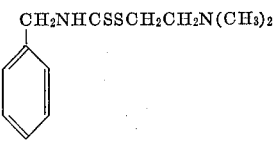

CH₂NHCSSCH₂CH₂N(CH₃)₂

EXAMPLE 5

2-dimethylaminoethyl (α-methylbenzyl)dithiocarbamate hydrochloride

To a mixture of approximately 81 parts of α-methylbenzyl isothiocyanate, 2 parts of triethylamine, and 400 parts of methanol is added 71 parts of 2-dimethylaminoethanethiol hydrochloride. The resultant solution is allowed to stand for 30 minutes at room temperatures, whereupon 350 parts of ether is introduced. A precipitate forms. The precipitate is isolated by filtration and consecutively recrystallized from mixtures of (1) chloroform with 2-butanone and (2) 2-butanone with methanol to give 2-dimethylaminoethyl (α-methylbenzyl)dithiocarbamate hydrochloride melting at 162–164.5°. The product has the formula

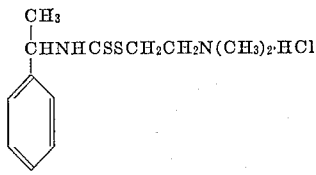

CH₃
|
CHNHCSSCH₂CH₂N(CH₃)₂·HCl

EXAMPLE 6

2-dimethylaminoethyl (3-phenylpropyl)dithiocarbamate hydrochloride

To a solution of 550 parts of potassium isothiocyanate and 450 parts of sodium iodide in 4750 parts of dimethylformamide at the boiling point under reflux is added, during 6 minutes, a hot solution of 913 parts of (3-bromopropyl)benzene in 3800 parts of dimethylformamide. The reaction mixture is allowed to stand for 5 minutes, then poured onto 10,000 parts of ice. An oil separates. The aqueous phase is removed therefrom and partitioned between water and ether. The ether phase is separated and combined with the oil. The resultant material is washed with water, dried over anhydrous sodium sulfate, and stripped of solvent by distillation. The residue is distilled in vacuo. Approximately 63 parts of the fraction boiling at 143–146°/10 mm. is added to a mixture of 51 parts of 2-dimethylaminoethanethiol hydrochloride, 2 parts of triethylamine, and 80 parts of methanol. An exothermic reaction ensues, and a solid precipitate forms. The solid is filtered off and combined with a second crop of precipitate obtained by concentrating the filtrate via vacuum distillation, diluting the concentrate with 2-butanone q.s. incipient turbidity, and chilling. Recrystallization from acetronitrile affords 2-dimethylaminoethyl (3-phenylpropyl)dithiocarbamate hydrochloride melting at 153.5–155°. The product has the formula

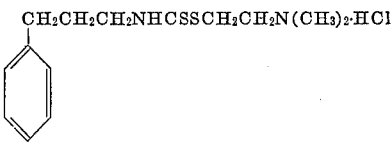

CH₂CH₂CH₂NHCSSCH₂CH₂N(CH₃)₂·HCl

EXAMPLE 7

2-dimethylaminoethyl (p-methylbenzyl)dithiocarbamate hydrochloride

To approximately 81 parts of p-methylbenzyl isothiocyanate, 2 parts of triethylamine, and 400 parts of methanol is added 71 parts of 2-dimethylaminoethanethiol hydrochloride. Heat is evolved. After 10 minutes, 70 parts of ether is introduced. The precipitate which forms is filtered off and dried in air. The material thus isolated is 2 - dimethylaminoethyl (p-methylbenzyl)dithiocarbamate hydrochloride melting at 167–168.5°. The product has the formula

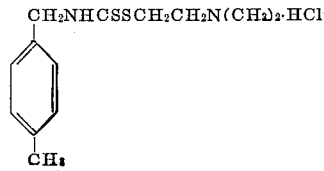

CH₂NHCSSCH₂CH₂N(CH₃)₂·HCl

CH₃

EXAMPLE 8

(A) p-Tert-butylbenzyl chloride

To a mixture of 160 parts of tert-butylbenzene with 800 parts of carbon tetrachloride and 100 parts of chloromethyl methyl ether at —5° is added, during 1½ hours with continuous stirring, 78 parts of stannic chloride, followed by 500 parts of ice. Carbon tetrachloride is removed from the reaction mixture by distillation, whereupon the distilland is steam-distilled to remove unreacted tert-butylbenzene and then separated into an aqueous phase, which is extracted with ether, and an organic phase, with which the ether extract is combined. The resultant solution is washed with water, dried over anhydrous sodium sulfate, and freed of solvent by distillation. The residue is p-tert-butylbenzyl chloride.

(B) p-Tert-butylbenzyl isothiocyanate

To a solution of 390 parts of potassium thiocyanate and 300 parts of sodium iodide in 3800 parts of dimethylformamide at the boiling point under reflux is added, during 15 minutes, a hot solution of 658 parts of p-tert-butylbenzyl chloride in 2850 parts of dimethylformamide. Boiling under reflux is continued for 10 minutes, whereupon the reaction mixture is poured onto 10,000 parts of ice. The oil which separates graduates on standing The granular material, filtered off and recrystallized from pentane, affords p-tert-butylbenzyl isothiocyanate melting at 42–45°.

(C) 2-dimethylaminoethyl (p-tert-butylbenzyl)-
dithiocarbamate hydrochloride

A mixture of 142 parts of 2-dimethylaminoethanethiol hydrochloride with 190 parts of p-tert-butylbenzyl isothiocyanate, 3 parts of triethylamine, and 800 parts of methanol is heated until solution occurs. The solution is chilled. Precipitation occurs. The precipitate is filtered off and recrystallized from methanol to give 2-dimethylaminoethyl (p-tert-butylbenzyl)dithiocarbamate hydrochloride melting at 200–203°. The product has the formula

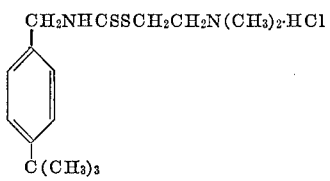

EXAMPLE 9

2-dimethylaminoethyl (2,5-dimethylbenzyl)-
dithiocarbamate hydrochloride

To a mixture of 71 parts of 2-dimethylaminoethanethiol hydrochloride with approximately 89 parts of 2,5-dimethylbenzyl isothiocyanate and 160 parts of methanol is added 2 parts of triethylamine. The resultant solution is allowed to stand at room temperatures overnight, at which point the resultant crystalline precipitate is filtered out and dried in air. The product thus isolated is 2-dimethylaminoethyl (2,5-dimethylbenzyl)dithiocarbamate hydrochloride melting at 171–173.5°. It has the formula

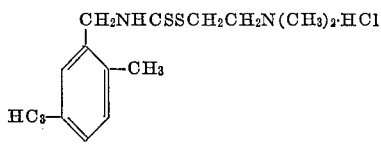

EXVAMPLE 10

2-dimethylaminoethyl (p-methoxybenzyl)di-
thiocarbamate hydrochloride

To a mixture of approximately 48 parts of 2-dimethylaminoethanethiol hydrochloride with 60 parts of p-methoxybenzyl isothiocyanate and 400 parts of methanol is added 2 parts of triethylamine. The resultant solution is allowed to stand at room temperatures for 3 hours, whereupon 350 parts of ether is introduced. The precipitate thrown down is filtered off and recrystallized—first from a mixture of methanol and chloroform and then from a mixture of methanol and 2-butanone—to give 2 - dimethylaminoethyl (p-methoxybenzyl)dithiocarbamate hydrochloride melting at 178–182.5°. The product has the formula

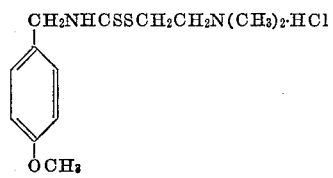

EXAMPLE 11

(A) o-Chlorobenzyldithiocarbamic acid tri-
ethylamine salt

To a solution of 226 parts of o-chlorobenzylamine and 157 parts of triethylamine in 1050 parts of ether at around 20° is slowly added a solution of 125 parts of carbon disulfide in 140 parts of ether. An oil forms, which granulates on standing. Filtered off and dried in air, the solid product melts at 106–109° with decomposition. The material thus isolated is the triethylamine salt of o-chlorobenzyldithiocarbamic acid.

(B) 2-dimethylaminoethyl (o-chlorobenzyl)-
dithiocarbamate hydrochloride

To a slurry of 149 parts of the triethylamine salt of o-chlorobenzyldithiocarbamic acid in 400 parts of methanol is added, with agitation, a solution of 67 parts of 2-dimethylaminoethyl chloride hydrochloride in 320 parts of methanol. Agitation is continued for several hours while solution occurs, whereupon solvent is removed by vacuum distillation. The residue is mixed with 135 parts of dichloromethane and 100 parts of water. The mixture is acidified with concentrated hydrochloric acid, whereupon the aqueous phase is separated, neutralized with sodium carbonate, and extracted with dichloromethane. The dichloromethane extract is washed with water, dried over anhydrous sodium sulfate, and stripped of solvent by vacuum distillation. The residue is taken up in ether, and the ether solution is acidified with isopropanolic hydrogen chloride. The solid which precipitates is filtered off and consecutively recrystallized from acetone, methanol, and acetone to give 2-dimethylaminoethyl (o-chlorobenzyl)dithiocarbamate hydrochloride melting at 151–153°. The product has the formula

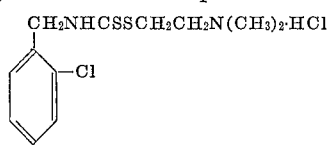

EXAMPLE 12

2-dimethylaminoethyl (m-chlorobenzyl)dithiocarbamate
hydrochloride

To a mixture of 71 parts of 2-dimethylaminoethanethiol hydrochloride with 92 parts of m-chlorobenzyl isothiocyanate and 96 parts of methanol is added 2 parts of triethylamine. Solution, followed by precipitation, occurs. The precipitate, filtered off and dried in air, melts at 164–166°. The product thus isolated is 2-dimethylaminoethyl (m-chlorobenzyl)dithiocarbamate hydrochloride, of the formula

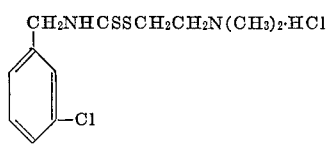

EXAMPLE 13

2-dimethylamino-1-methylethyl (o-chlorobenzyl)
dithiocarbamate hydrochloride

To a slurry of 149 parts of the triethylamine salt of o-chlorobenzyldithiocarbamic acid in 400 parts of methanol is added, with agitation, a solution of 80 parts of 3-dimethylamino-2-methylpropyl chloride hydrochloride in 400 parts of methanol. Agitation is continued overnight while solution occurs. The solution is stripped of solvent by vacuum distillation. The residue is triturated with approximately 100 parts of acetone, and the resultant mixture is filtered. The filtrate is diluted with ether q.s. incipient precipitation and then chilled. The precipitate thrown down is filtered off and recrystallized first from acetone, then from a mixture of acetone and 2-butanone, and finally from a mixture of acetone, dichloromethane, and methanol to give 2-dimethylamino-1-methylethyl (o-chlorobenzyl)dithiocarbamate hydrochloride melting at 145–149°. The product has the formula

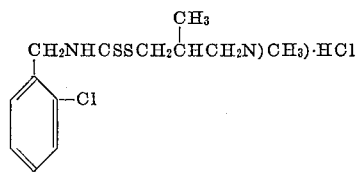

EXAMPLE 14

(A) 2-dimethylaminoethyl (p-chlorobenzyl)dithiocarbamate hydrochloride

To a mixture of 184 parts of p-chlorobenzyl isothiocyanate with 142 parts of 2-dimethylaminoethanethiol hydrochloride and 200 parts of methanol is added 2 parts of triethylamine. The resultant mixture is stirred. Solution, followed by precipitation occurs. The precipitate, filtered off and dried in air, melts at 188–190°. The product thus isolated is 2-dimethylaminoethyl (p-chlorobenzyl)dithiocarbamate hydrochloride.

(B) 2-dimethylaminoethyl (p-chlorobenzyl)dithiocarbamate

A warm solution of 20 parts of 2-dimethylaminoethyl (p-chlorobenzyl)dithiocarbamate hydrochloride in 80 parts of methanol and 150 parts of chloroform is mixed with approximately 100 parts of aqueous 5% sodium hydroxide. The aqueous phase is separated from the organic phase and extracted with chloroform. The chloroform extract is combined with the organic phase. The resultant solution is washed with water, dried over anhydrous sodium sulfate, and stripped of solvent by vacuum distillation. The residue is crystallized from a mixture of hexane and ether to give 2-dimethylaminoethyl (p-chlorobenzyl) dithiocarbamate melting at 83–86°. The product has the formula

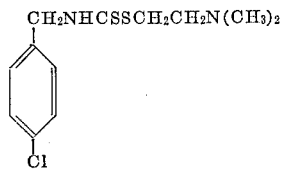

EXAMPLE 15

(A) p-fluorobenzyl isothiocyanate

To a solution of 55 parts of potassium thiocyanate and 42 parts of sodium iodide in 475 parts of dimethylformamide at the boiling point under reflux is added, during approximately 10 minutes, a warm solution of 72 parts of p-fluorobenzyl chloride in 380 parts of dimethylformamide. Boiling under reflux is continued for approximately 5 minutes longer, whereupon the reaction mixture is poured onto 1,000 parts of ice. The oil which forms is separated from the aqueous phase, which is extracted with ether. The ether extract is added to the oil; and the resultant solution is washed with water, dried over anhydrous sodium sulfate, and distilled. The fraction boiling at 110–117° under 10 mm. pressure is p-fluorobenzyl isothiocyanate.

(B) 2-dimethylaminoethyl (p-fluorobenzyl)dithiocarbamate hydrochloride

To a mixture of 100 parts of p-fluorobenzyl isothiocyanate with 85 parts of 2-dimethylaminoethanethiol hydrochloride and 120 parts of methanol is added 2 parts of triethylamine. The resultant mixture is stirred until solution occurs, whereupon it is chilled. A solid precipitate forms. The precipitate is filtered off and dried in air. The product thus isolated is 2-dimethylaminoethyl (p-fluorobenzyl)dithiocarbamate hydrochloride melting at 172–175°. The product has the formula

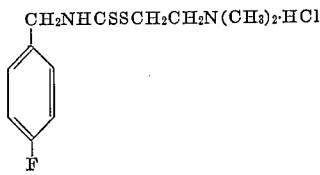

EXAMPLE 16

2-dimethylaminoethyl (p-bromobenzyl)dithiocarbamate hydrochloride

To a mixture of 58 parts of 2-dimethylaminoethanethiol hydrochloride with 92 parts of p-bromobenzyl isothiocyanate and 400 parts of methanol is added 2 parts of triethylamine, whereupon the temperature rises. Approximately 70 parts of ether is introduced. Precipitation occurs. The precipitate, filtered off and dried in air, melts at 182–185.5°. The product thus isolated is 2-dimethylaminoethyl (p-bromobenzyl)dithiocarbamate hydrochloride, of the formula

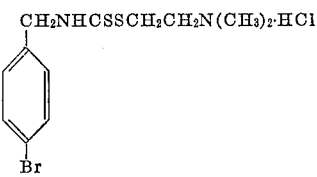

EXAMPLE 17

(A) 2,6-dichlorobenzyl isothiocyanate

To a solution of 55 parts of potassium thiocyanate and 42 parts of sodium iodide in 475 parts of dimethylformamide at the boiling point under reflux is added, during approximately 10 minutes, a hot solution of 100 parts of 2,6-dichlorobenzyl chloride in 380 parts of dimethylformamide. Boiling is continued for approximately 10 minutes longer, whereupon the reaction mixture is poured onto 1000 parts of ice. The solid which precipitates is separated and recrystallized from a mixture of ether and hexane to give 2,6-dichlorobenzyl isothiocyanate melting at 53.5–55°.

(B) 2-dimethylaminoethyl (2,6-dichlorobenzyl)-dithiocarbamate hydrochloride

To a mixture of 71 parts of 2-dimethylaminoethanethiol hydrochloride with 109 parts of 2,6-dichlorobenzyl isothiocyanate and 96 parts of methanol is added 2 parts of triethylamine. The resultant mixture is warmed until solution occurs, then chilled. The precipitate which forms is filtered off and dried in air. The material thus isolated is 2 - dimethylaminoethyl (2,6-dichlorobenzyl)dithiocarbamate hydrochloride melting at 189–191°. The product has the formula

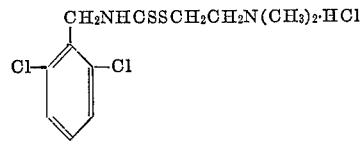

EXAMPLE 18

2-dimethylaminoethyl (3,4-dichlorobenzyl)dithiocarbamate hydrochloride

Approximately 146 parts of 2-dimethylaminoethanethiol hydrochloride is dissolved in a mixture of 218 parts of 3,4-dichlorobenzyl isothiocyanate with 800 parts of methanol. Approximately 3 parts of triethylamine, followed by 800 parts of hot methanol, is introduced. The resultant solution is filtered. The filtrate is concentrated to approximately ½ volume by distillation, then chilled. Precipitation occurs. The precipitate is filtered off and dried in air. The product thus isolated is 2-dimethylaminoethyl (3,4-dichlorobenzyl)dithiocarbamate hydrochloride melting at 181–184°. It has the formula

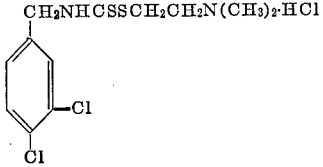

EXAMPLE 19

(A) m-Trifluoromethylbenzyl isothiocyanate

To a solution of 22 parts of potassium thiocyanate and 15 parts of sodium iodide in 190 parts of dimethylformamide at the boiling point under reflux is added, during approximately 10 minutes, a hot solution of 39 parts of m-trifluoromethylbenzyl chloride in 190 parts of dimethylformamide. Boiling is continued for approximately 5 minutes, whereupon the reaction mixture is poured onto 700 parts of ice. The oil which forms is separated and combined with a dichloromethane extract of the aqueous phase. The resultant solution is dried over anhydrous sodium sulfate and distilled. The fraction boiling at 136–140° under 20 mm. pressure is m-trifluoromethylbenzyl isothiocyanate.

(B) 2-dimethylaminoethyl (m-trifluoromethylbenzyl) dithiocarbamate hydrochloride To a mixture of 142 parts of 2-dimethylaminoethanethiol hydrochloride with 216 parts of m-trifluoromethylbenzyl isothiocyanate and 400 parts of methanol is added 3 parts of triethylamine. Approximately ½ the methanol is removed from the reaction mixture by distillation and replaced with 700 parts of ether. The precipitate which forms is filtered off and dried in vacuo. The product thus isolated is 2-dimethylaminoethyl (m-trifluoromethylbenzyl)dithiocarbamate hydrochloride melting at 135–138°. It has the formula

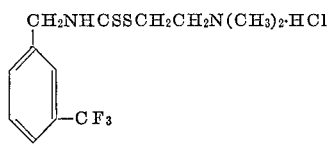

EXAMPLE 20

(A) m-Nitrobenzyl isothiocyanate

To a solution of 550 parts of potassium thiocyanate and 550 parts of sodium iodide in 4750 parts of dimethylformamide at the boiling point under reflux is added, during 10 minutes, a hot solution of 785 parts of m-nitrobenzyl chloride in 3800 parts of dimethylformamide. Boiling is continued for 7 minutes longer, whereupon the reaction mixture is poured onto 40,000 parts of ice. A solid forms, which is filtered off and extracted with ether. The ether extract is stripped of solvent by distillation. The residue is m-nitrobenzyl isothiocyanate melting at 65–71°.

(B) 2-dimethylaminoethyl (m-nitrobenzyl)dithiocarbamate hydrochloride

To a mixture of 142 parts of 2-dimethylaminoethanethiol hydrochloride with 194 parts of m-nitrobenzyl isothiocyanate and 400 parts of methanol is added 3 parts of triethylamine. Solution occurs. The precipitate eventually thrown down is filtered off and recrystallized from a mixture of isopropanol and methanol to give 2-dimethylaminoethyl (m-nitrobenzyl)dithiocarbamate hydrochloride melting at 156–158°. The product has the formula

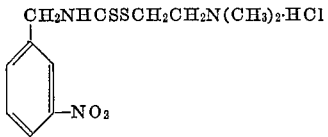

EXAMPLE 21

(A) p-Phenylbenzyl isothiocyanate

To a solution of 14 parts of potassium thiocyanate and 11 parts of sodium iodide in approximately 120 parts of dimethylformamide at the boiling point under reflux is added, during approximately 5 minutes, a hot solution of 25 parts of p-phenylbenzyl chloride in 95 parts of dimethylformamide. Boiling is continued for approximately 5 minutes longer, whereupon the reaction mixture is poured onto 1000 parts of ice. The solid which precipitates is filtered off and dried in air. The product thus isolated is p-phenylbenzyl isothiocyanate melting at 55–60°.

(B) 2-dimethylaminoethyl (p-phenylbenzyl)dithiocarbamate hydrochloride

To a mixture of 36 parts of 2-dimethylaminoethanethiol hydrochloride with 56 parts of p-phenylbenzyl isothiocyanate and 80 parts of methanol is added 2 parts of triethylamine. The reaction mixture is warmed briefly until solution occurs, then chilled. The precipitate thrown down is filtered off and dried in air. The product thus isolated is 2 - dimethylaminoethyl (p-phenylbenzyl)dithiocarbamate hydrochloride melting at 170–172°. It has the formula

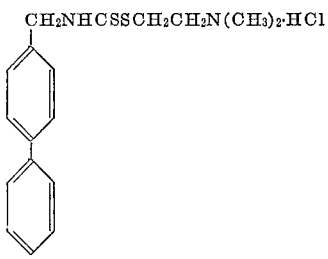

EXAMPLE 22

(A) 2-methyl-5-nitrobenzyl isothiocyanate

To a solution of 340 parts of potassium thiocyanate and 260 parts of sodium iodide in 2850 parts of dimethylformamide at the boiling point under reflux is added, during approximately 5 minutes, a hot solution of 577 parts of 2-methyl-5-nitrobenzyl chloride in 2375 parts of dimethylformamide. Boiling is continued for approximately 10 minutes longer, whereupon the reaction mixture is poured onto 7000 parts of ice. The oil which forms is separated from an aqueous phase and combined with a dichloromethane extract thereof. The resultant material is washed with water, dried over anhydrous sodium sulfate, and stripped of solvent by vacuum distillation. The residue is 2-methyl-5-nitrobenzyl isothiocyanate.

(B) 2-dimethylaminoethyl (2-methyl-5-nitrobenzyl) dithiocarbamate tetartoacetonate To a solution of 103 parts of 2-methyl-5-nitrobenzyl isothiocyanate in 160 parts of acetone is added a slurry of 71 parts of 2-dimethylaminoethanethiol hydrochloride in 80 parts of methanol, followed by 2 parts of triethylamine. Solution occurs. The solution is diluted with 1000 parts of water, washed with ether, neutralized with sodium carbonate, and extracted with dichloromethane. The extract is stripped of solvent by vacuum distillation. The residue is crystallized from a mixture of acetone and ether to give 2-dimethylaminoethyl (2-methyl-5-nitrobenzyl)dithiocarbamate as the tetratoacetonate melting at 110–114°. Vacuum drying removes the acetone of crystallization. The solvated product has the formula

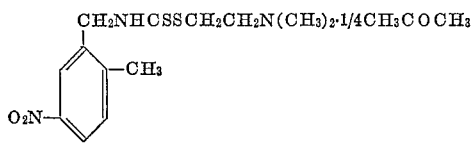

EXAMPLE 23

(A) 5-acetyl-2,4-dimethylbenzyl isothiocyanate

To a solution of 190 parts of potassium thiocyanate and 150 parts of sodium iodide in 1900 parts of dimethylformamide at the boiling point under reflux is added, during approximately 10 minutes, a hot solution of 313 parts of 5-chloromethyl-2,4-dimethylacetophenone in 1425 parts of dimethylformamide. Boiling is continued for approximately 15 minutes, whereupon the reaction mixture is poured onto 7000 parts of ice. An oil forms, which granulates on standing. The granular material is filtered off and recrystallized from a mixture of acetone, ether, and hexane to give 5-acetyl-2,4-dimethylbenzyl isothiocyanate melting at 46–53°.

(B) 2-dimethylaminoethyl (5-acetyl-2,4-dimethylbenzyl)dithiocarbamate hydrochloride To a mixture of 144 parts of 2-dimethylaminoethanethiol hydrochloride with 220 parts of 5-acetyl-2,4-dimethylbenzyl isothiocyanate and 320 parts of methanol is added 3 parts of triethylamine. The resultant mixture is warmed until solution occurs, whereupon pentane is introduced q.s. incipient precipitation. Precipitation is furthered by cooling. The precipitate is filtered off and dried in air. The product thus isolated is 2-dimethylaminoethyl (5-acetyl-2,4-dimethylbenzyl)dithiocarbamate hydrochloride melting at 155–158°. It has the formula

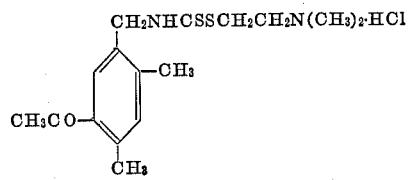

EXAMPLE 24

(A) 2-diethylaminoethyl (p-methylbenzyl)dithiocarbamate hydrochloride

To a mixture of 170 parts of 2-diethylaminoethanethiol hydrochloride with 163 parts of p-methylbenzyl isothiocyanate and 360 parts of methanol is added 3 parts of triethylamine. Approximately two-thirds of the methanol is removed by distillation and replaced with ether q.s. incipient precipitation. The resultant mixture is chilled. The precipitate which forms is filtered off and recrystallized from a mixture of chloroform and 2-butanone to give 2-diethylaminoethyl (p-methylbenzyl)dithiocarbamate hydrochloride melting at 144.5–147°.

(B) 2-diethylaminoethyl (p-methylbenzyl)dithiocarbamate hemi-4,4'-methylenebis(3-hydroxy-2-naphthoate)

To a solution of approximately 67 parts of 2-diethylaminoethyl (p-methylbenzyl)dithiocarbamate hydrochloride in 1000 parts of water is added a solution of 39 parts of pamoic acid [4,4'-methylenebis(3-hydroxy-2-naphthoic acid)] and 8 parts of sodium hydroxide in 1000 parts of water. The solid which precipitates is filtered off and crystallized from aqueous methanol. The product thus isolated is 2-diethylaminoethyl (p-methylbenzyl)dithiocarbamate hemi-4,4'-methylenebis(3-hydroxy-2-naphthoate, having the formula

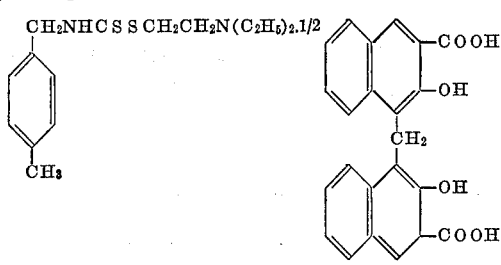

EXAMPLE 25

(A) 2-diethylaminoethyl (2,5-dimethylbenzyl)dithiocarbamate hydrochloride

To a mixture of 187 parts of 2-diethylaminoethanethiol hydrochloride with 177 parts of 2,5-dimethylbenzyl isothiocyanate and 200 parts of methanol is added 2 parts of triethylamine. The solid which precipitates is removed by filtration. The filtrate is concentrated to approximately one-fourth of its original volume by distillation, and the concentrate is diluted with 400 parts of 2-butanone and 350 parts of ether. The precipitate thrown down is filtered off and dried in air. The product thus isolated is 2-diethylaminoethyl (2,5 - dimethylbenzyl)dithiocarbamate hydrochloride melting at 109–112°.

(B) 2-diethylaminoethyl (2,5-dimethylbenzyl)dithiocarbamate

Approximately 202 parts of 2-diethylaminoethyl (2,5-dimethylbenzyl)dithiocarbamate hydrochloride is partitioned between 1000 parts of aqueous 3% sodium hydroxide and 670 parts of dichloromethane. The dichloromethane phase is separated, dried over anhydrous sodium sulfate, and stripped of solvent by vacuum distillation. The residue is crystallized from a mixture of hexane and ether. The product this isolated is 2-diethylaminoethyl (2,5-dimethylbenzyl)dithiocarbamate melting at 75–77°. It has the formula

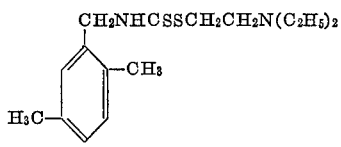

(C) 2-diethylaminoethyl (2,5-dimethylbenzyl)dithiocarbamate methobromide

Into a cold solution of 93 parts of 2-diethylaminoethyl (2,5-dimethylbenzyl)dithiocarbamate in 810 parts of 2-butanone is introduced 210 parts of methyl bromide. The resultant mixture is maintained in a sealed vessel while the oil which forms, crystallizes. The crystalline material is filtered out and recrystallized from a mixture of chloroform and 2-butanone to give 2-dimethylaminoethyl (2,5-dimethylbenzyl)thiocarbamate methobromide melting at 129–132°.

EXAMPLE 26

2-(1-pyrrolidinyl)ethyl benzyldithiocarbamate hydrochloride

To a solution of 75 parts of benzyl isothiocyanate in 120 parts of methanol is added 49 parts of 1-(2-mercaptoethyl)pyrrolidine. The temperature rises, whereupon approximately 58 parts of isopropanolic 25% hydrogen chloride is introduced. The precipitate which forms is filtered off and dried in air. The product thus isolated is 2-(1-pyrrolidinyl)ethyl benzyldithiocarbamate hydrochloride, of the formula

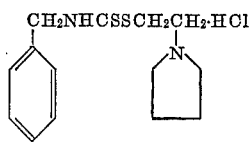

EXAMPLE 27

2-(4-ethylpiperidino)-1,1-dimethylethyl benzyldithiocarbamate maleate

To a solution of 75 parts of benzyl isothiocyanate in 120 parts of methanol is added 84 parts of 4-ethyl-1-(2-mercapto-2-methylpropyl)piperidine. The reaction mixture is warmed gently for 3 hours, whereupon a solution of 58 parts of maleic acid in 160 parts of warm methanol is introduced. The resultant mixture is chilled. Precipitation occurs. The precipitate is filtered off and dried in air. The product this isolated is 2-(4-ethylpiperidino)-1,1-dimethylethyl benzyldithiocarbamate maleate, having the formula

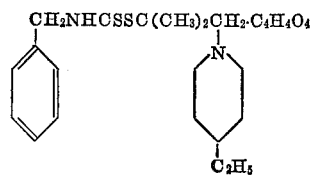

EXAMPLE 28

2-morpholinoethyl benzyldithiocarbamate hydrochloride

To a solution of 75 parts of benzyl isothiocyanate in 120 parts of methanol is added 57 parts of 4-(2-mercaptoethyl)morpholine. The resultant mixture is allowed to stand for 15 minutes, whereupon approximately 58 parts of isopropanolic 25% hydrogen chloride is introduced. The resultant mixture is chilled. The precipitate which forms is filtered off and dried in air. The product thus obtained is 2 - morpholinoethyl benzyldithiocarbamate hydrochloride, having the formula

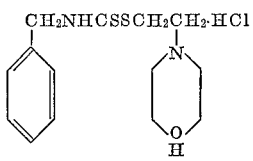

EXAMPLE 29

2-(1-piperazinyl)ethyl benzyldithiocarbamate dihydrochloride

To a mixture of 92 parts of 1-(2-mercaptoethyl)piperazine dihydrochloride with 75 parts of benzyl isothiocyanate and 125 parts of methanol is added 2 parts of triethylamine. The resultant mixture is warmed gently until solution occurs, whereupon it is chilled. The precipitate which eventuates is filtered off and dried in air. The product thus isolated is 2-(1-piperazinyl)ethyl benzyldithiocarbamate, of the formula

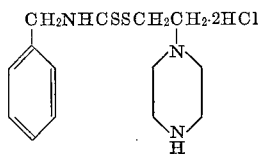

EXAMPLE 30

2-(4-methyl-1-piperazinyl)ethyl (p-chlorobenzyl) dithiocarbamate dimaleate

To a mixture of 92 parts of p-chlorobenzyl isothiocyanate with 80 parts of 1-(2-mercaptoethyl)-4-methylpiperazine and 120 parts of methanol is added a warm solution of 116 parts of maleic acid in 320 parts of methanol. The resultant mixture is chilled. The precipitate thrown down is filtered off and dried in air. The product thus isolated is 2-(4-methyl-1-piperazinyl)ethyl (p-chlorobenzyl)dithiocarbamate dimaleate melting at 139–142° with decomposition. The product has the formula

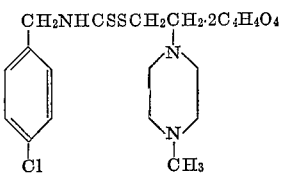

EXAMPLE 31

2-(4-methyl-1-piperazinyl)ethyl (3,4-dichlorobenzyl)dithiocarbamate citrate

To a mixture of 40 parts of 1-(2-mercaptoethyl)-4-methylpiperazine with 55 parts of 3,4-dichlorobenzyl isothiocyanate and 80 parts of methanol is added a solution of 48 parts of citric acid in 160 parts of methanol. The resultant solution is concentrated to one-third of its original volume by distillation, and the concentrate is diluted with 240 parts of 2-butanone. The precipitate which forms is filtered off and dried in vacuo. It melts at 103–107° The product thus isolated is 2-(4-methyl-1-piperazinyl)ethyl (3,4-dichlorobenzyl) dithiocarbamate citrate, having the formula

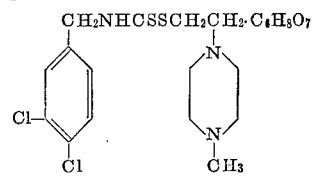

What is claimed is:
1. A compound of the formula

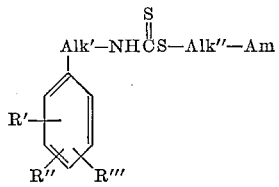

wherein R′, R″, and R‴ each represent hydrogen, halogen, lower alkyl, lower alkoxy, trifluoromethyl, nitro, acetyl, or phenyl; Alk′ represents alkylene containing fewer than 4 carbon atoms, Alk″ represents lower alkylene; and Am represents amino, alkylamino containing fewer than 11 carbon atoms, di(lower alkyl)amino, piperazino, N-methylpiperazino, morpholino, or a radical of the formula

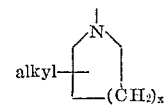

in which $x$ represents a positive integer less than 3 and the alkyl substituent called for contains fewer than 3 carbon atoms.

2. A compound according to claim 1 in which the di (lower alkyl)amino radical represented by Am is a dimethylamino grouping.

3. A compound according to claim 1 having the formula

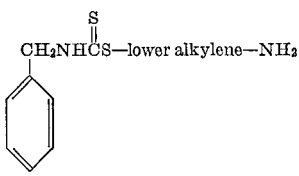

4. A compound according to claim 1 which is 2-aminoethyl benzyldithiocarbamate.

5. A compound according to claim 1 having the formula

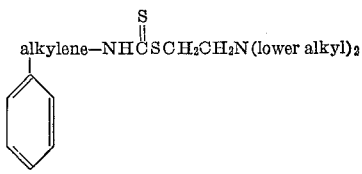

wherein the alkylene radical called for contains fewer than 4 carbon atoms.

6. A compound according to claim 1 which is 2-dimethylaminoethyl (α-methylbenzyl)dithiocarbamate.

7. A compound according to claim 1 having the formula

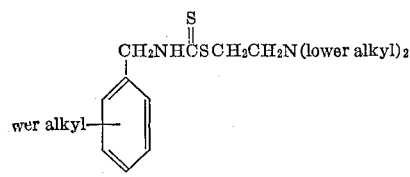

8. A compound according to claim 1 which is 2-dimethylaminoethyl (p-methylbenzyl)dithiocarbamate.

9. A compound according to claim 1 having the formula

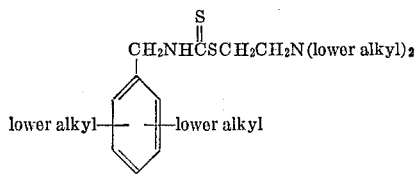

10. A compound according to claim 1 which is 2-dimethylaminoethyl (2,5-dimethylbenzyl)dithiocarbamate.

11. A compound according to claim 1 which is 2-dimethylaminoethyl (p-methoxybenzyl)dithiocarbamate.

12. A compound according to claim 1 having the formula

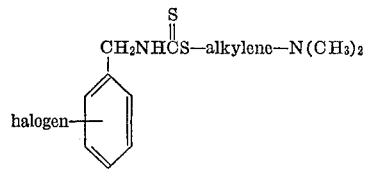

wherein the alkylene radical called for contains fewer than 5 carbon atoms.

13. A compound according to claim 1 which is 2-dimethylaminoethyl (p-bromobenzyl)dithiocarbamate.

14. A compound according to claim 1 having the formula

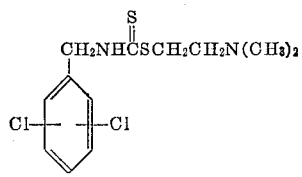

15. A compound according to claim 1 which is 2-dimethylaminoethyl (3,4-dichlorobenzyl)dithiocarbamate.

16. A compound according to claim 1 which is 2-dimethylaminoethyl (m-nitrobenzyl)dithiocarbamate.

References Cited

Cherbuliez et al.: "Helo, Chem. Acta." 48 (1965), p. 1417.

Ferris: "J. Org. Chem.," 28 (1963), pp. 3142–43.

CHARLES B. PARKER, Primary Examiner

D. R. PHILLIPS, Assistant Examiner

U.S. Cl. X.R.

260—247, 268, 293.4, 326.83, 453, 513.5, 651; 424—248, 250, 267, 274, 300